(12) United States Patent
Chatterton et al.

(10) Patent No.: US 10,776,479 B2
(45) Date of Patent: Sep. 15, 2020

(54) AUTHENTICATION SYSTEM

(71) Applicant: PAYPAL, INC., San Jose, CA (US)

(72) Inventors: Geoffrey W. Chatterton, Santa Clara, CA (US); Ramaneek Khanna, Saratoga, CA (US); Timothy C. Nichols, Los Altos, CA (US)

(73) Assignee: PAYPAL, INC., San Jose, CA (US)

( * ) Notice: Subject to any disclaimer, the term of this patent is extended or adjusted under 35 U.S.C. 154(b) by 405 days.

(21) Appl. No.: 15/431,718

(22) Filed: Feb. 13, 2017

(65) Prior Publication Data

US 2017/0154180 A1 Jun. 1, 2017

Related U.S. Application Data

(63) Continuation of application No. 14/012,753, filed on Aug. 28, 2013, now abandoned.

(51) Int. Cl.
*G06F 21/44* (2013.01)
*G06Q 20/40* (2012.01)
(Continued)

(52) U.S. Cl.
CPC .............. *G06F 21/44* (2013.01); *G06F 21/45* (2013.01); *G06Q 20/322* (2013.01);
(Continued)

(58) Field of Classification Search
None
See application file for complete search history.

(56) References Cited

U.S. PATENT DOCUMENTS 6,609,113 B1   8/2003   O'Leary et al.
7,356,703 B2 *  4/2008   Chebolu ............... H04L 63/102
                                                                    713/182
(Continued)

FOREIGN PATENT DOCUMENTS

JP   2007-68016    10/2008
JP   2009-146193    7/2009
(Continued)

OTHER PUBLICATIONS

Shepherd et al., provisional specification of 2014/0283141 entitled Mobile Computing Device with Multiple Access Modes, Mar. 15, 2013, entire document (Year: 2013).*

(Continued)

*Primary Examiner* — Christopher Bridges
(74) *Attorney, Agent, or Firm* — Haynes and Boone, LLP

(57) ABSTRACT

Systems and methods for providing authentication include receiving an authentication passcode input through an input device of a user device from a first user. The first user is authenticated in response to the authentication passcode input matching at least one user authentication passcode in a database, and an authentication time period is associated with the authentication of the first user and allows the first user access to at least one application on the user device. A plurality of authentication factors are then detected using the user device, and plurality of authentication factors are not an authentication passcode input received through the input device. The plurality of authentication factors are then determined to match the at least one authentication profile in the database and, in response, the authentication time period is extended such that the first user is allowed continued access to the at least one application on the user device.

20 Claims, 12 Drawing Sheets

(51) Int. Cl.
  *G06Q 20/42* (2012.01)
  *G06Q 20/32* (2012.01)
  *G06F 21/45* (2013.01)

(52) U.S. Cl.
  CPC ......... *G06Q 20/3224* (2013.01); *G06Q 20/40* (2013.01); *G06Q 20/40145* (2013.01); *G06Q 20/42* (2013.01)

(56) References Cited

U.S. PATENT DOCUMENTS

| | | | |
|---|---|---|---|
| 8,220,034 B2 | 7/2012 | Hahn et al. | |
| 8,255,539 B2* | 8/2012 | Pierlot | G06F 21/335 709/227 |
| 8,590,018 B2* | 11/2013 | Thavasi | G06F 21/31 726/4 |
| 8,590,021 B2* | 11/2013 | Steeves | H04L 63/0492 726/5 |
| 8,812,395 B2* | 8/2014 | Webber | G06Q 30/0601 705/35 |
| 8,918,479 B2* | 12/2014 | O'Connell | G06F 21/55 709/203 |
| 2001/0027527 A1* | 10/2001 | Khidekel | H04L 63/0861 726/9 |
| 2002/0095586 A1* | 7/2002 | Doyle | G06F 21/32 713/186 |
| 2006/0026535 A1 | 2/2006 | Hotelling et al. | |
| 2006/0288234 A1 | 12/2006 | Azar et al. | |
| 2007/0136573 A1* | 6/2007 | Steinberg | G06F 21/43 713/155 |
| 2007/0240202 A1* | 10/2007 | Sullivan | H04L 12/14 726/4 |
| 2008/0278455 A1* | 11/2008 | Atkins | G06F 3/0488 345/173 |
| 2009/0049544 A1 | 2/2009 | Kashi | |
| 2010/0192209 A1 | 7/2010 | Steeves et al. | |
| 2011/0251892 A1 | 10/2011 | Laracey | |
| 2012/0046012 A1 | 2/2012 | Forutanpour et al. | |
| 2012/0054057 A1 | 3/2012 | O'Connell et al. | |
| 2012/0110058 A1 | 5/2012 | Kuroda | |
| 2012/0259740 A1 | 11/2012 | Webber et al. | |
| 2013/0109369 A1 | 5/2013 | Forutanpour et al. | |
| 2013/0160111 A1* | 6/2013 | Orr | G06F 21/32 726/19 |
| 2014/0157381 A1 | 6/2014 | Disraeli | |
| 2014/0282965 A1* | 9/2014 | Sambamurthy | G06F 21/31 726/7 |
| 2014/0283014 A1* | 9/2014 | Tse | G06F 21/32 726/19 |
| 2014/0283141 A1* | 9/2014 | Shepherd | G06F 21/6245 726/30 |

FOREIGN PATENT DOCUMENTS

| | | |
|---|---|---|
| KR | 2013-0066657 | 6/2013 |
| WO | WO 2012/024436 | 2/2012 |
| WO | WO 2013/062771 | 5/2013 |

OTHER PUBLICATIONS

Frank et al., "Touchalytics: On the Applicability of Touchscreen Input as a Behavioral Biometric for Continuous Authentication", Oct. 16, 2012, 20 pages, vol. 8, Issue 1, IEEE Transactions on Information Forensics and Security, Piscataway, New Jersey.

Feng et al., "Continuous Mobile Authentication using Touchscreen Gestures", Nov. 13-15, 2012, pp. 451-456, Homeland Security (HST), IEEE Conference on Technologies, Piscataway, New Jersey.

* cited by examiner

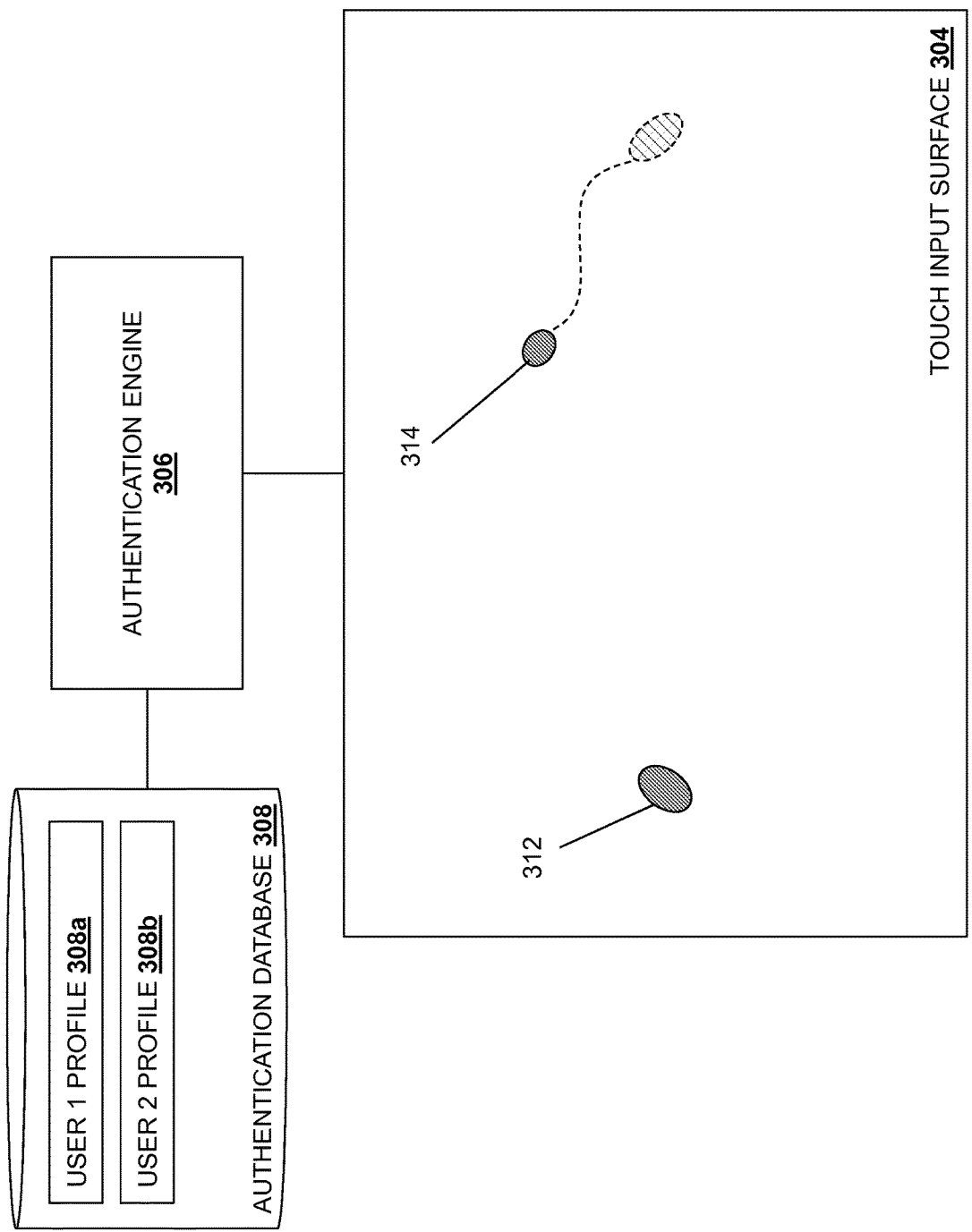

AUTHENTICATION SYSTEM

CROSS REFERENCE

This application is a continuation of U.S. patent application Ser. No. 14/012,753, filed Aug. 28, 2013, which is hereby incorporated by reference in its entirety.

BACKGROUND

Field of the Invention

The present invention generally relates to online and/or mobile payments and more particularly to authenticating for an authentication time period, followed by continuing to authenticate beyond the authentication time period, a user for a payment application based on authentication factors that indicate that the user is an authorized user.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Online and/or mobile payments may be facilitated using, for example, a payment application on a user device. However, because the payment application allows for funds of the user to be spent and/or otherwise transferred from that user, the proper and accurate authentication of the user with the user device and/or the payment application is critical. Typically, the user must enter a user authentication passcode into the user device and/or payment application in order to authenticate as an authorized user. Some user devices and/or applications that allow access to financial or other sensitive information of a user may employ relatively high security settings that require the user to authenticate each time the user device and/or application has been left idle for a predetermined period of time. When such high security settings are enabled and the predetermined period of idle time is relatively low, the user may be required to regularly and continuously authenticate themselves on the user device and/or application, which is time-consuming and annoying to the user.

Thus, there is a need for an improved authentication system.

BRIEF DESCRIPTION OF THE FIGURES

FIG. 3c is a schematic view illustrating an embodiment of a user providing authentication factors on a user device;

Figure 1:
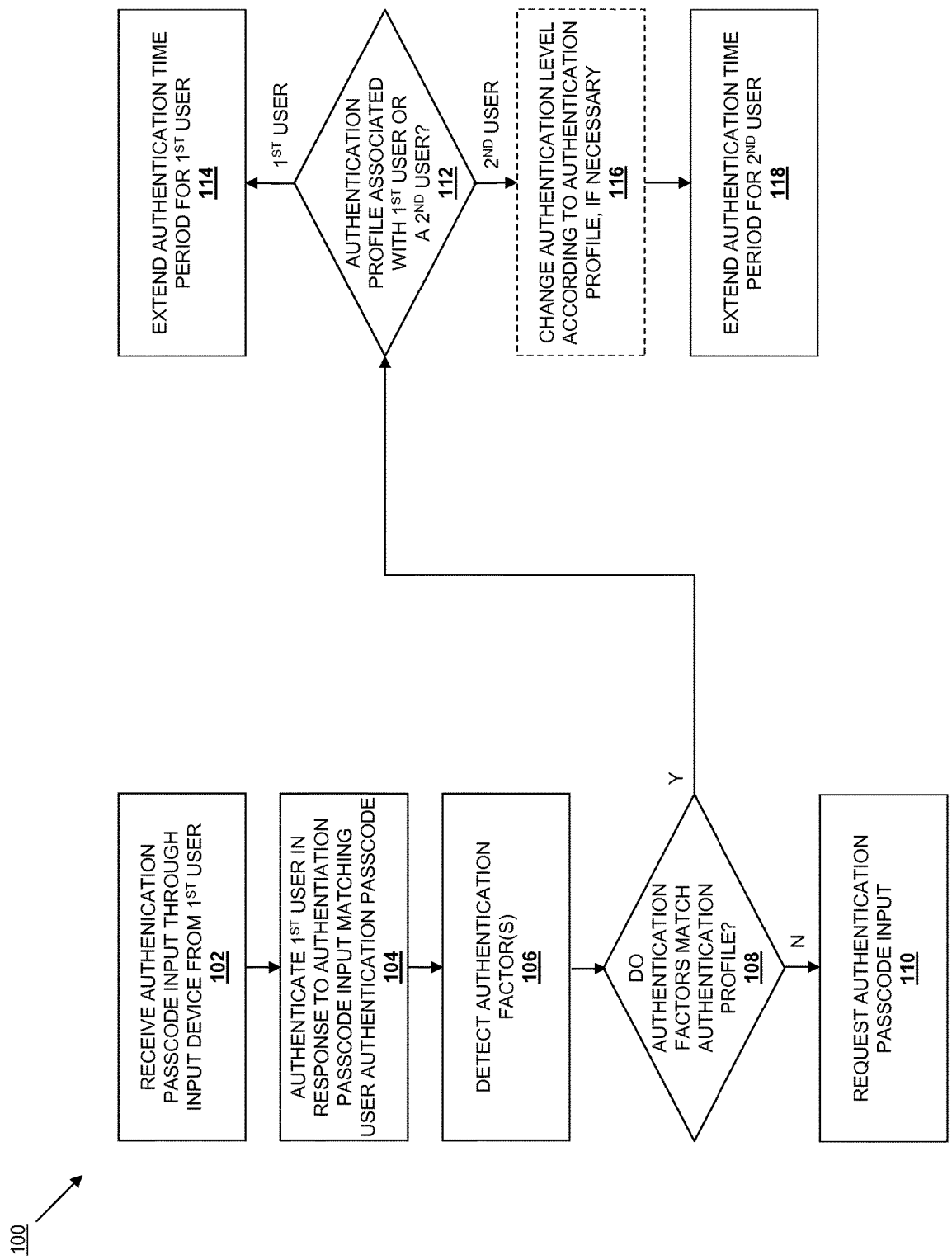
FIG. 1 is a flow chart illustrating an embodiment of a method for authenticating one or more users.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for authenticating a user to access to one or more applications on a user device for an authentication time period, and then extending that authentication time period for that user or another user based on authentication factors in one or more authentication profiles that are automatically detected by the user device, rather than requiring the user to re-enter an authentication passcode input using an input device on the user device. The systems and methods allow a first user to provide an authentication passcode input through an input device on the user device (e.g., a string of any alphanumeric or other characters, a sequence of touch input gestures on a touch screen, etc.) to first access one or more applications on the user device. The systems and methods then detect authentication factors through the user device that are not an authentication passcode input provided through the input device and that are not purposely provided by any user of the user device for authentication. Just a few examples of authentication factors may include a plurality of wireless environments, a plurality of detected touch inputs, a plurality of application use details, captured images, captured sounds, and determined locations. If those authentication factors match an authentication profile in a database, the authentication time period may be extended such that the user may continue to access the one or more applications. Just a few examples of authentication profiles include a wireless environment authentication profile that describes a plurality of wireless environments indicative of a trusted location for the user device, a touch input authentication profile that describes a plurality of touch inputs that are indicative of a trusted user of the user device, an application use authentication profile that describes a plurality of application use details that are indicative of a trusted user for the user device, image profiles that includes images of trusted users, and voice profiles that include voices of trusted users.

In some embodiments, the authentication factors may match an authentication profile for the first user, and the authentication time period may be extended such that the first user may continue to access the one or more applications. In other embodiments, the authentication factors may match an authentication profile for a second user that has been authorized to use the one or more applications (e.g., by the first user) with a restricted authentication level, and the authentication time period may be extended such that the second user is provided continued access the one or more applications that is restricted relative to the access provided to the first user. For example, the one or more applications may include a payment application or the ability to use the payment application, and the restricted continued access may restrict the amount the second user may charge using the payment application (e.g., relative to the first user). In another example, at least one of a plurality of applications may be unavailable to the second user that is provided the restricted continued access (e.g., when the user is a child and the at least one of the plurality of applications includes adult content). Thus, systems and methods are provided that reduce the continuous authentication required of users of conventional secure user devices by detecting authentication factors present in the use of the user device that are not purposely provided by any user of the user device for authentication, but rather are produced through normal use of the user device, and using those authentication factors to determine whether continued access should be provided. Such systems and methods greater reduce the frequency at which users of a user device must provide an authentication passcode input via an input device on the user device, while providing desired level of security for the user device.

Referring now to FIG. 1, an embodiment of a method 100 for authenticating one or more users is illustrated. In the embodiments discussed below, a user device includes one or more applications that may include an operating system, a payment application, an internet browser, and/or a variety of other applications known in the art. In specific examples discussed below, the application includes a payment application such as, for example, the PayPal payment application available from PayPal, Inc. of San Jose, Calif., that allows a user to instruct a payment service provider (e.g., PayPal, Inc.) to transfer funds from a user account of the user to a merchant account of the merchant to make a payment for a purchase. However, one of skill in the art in possession of the present disclosure will recognize that any application access, from access to an operating system application that operates essentially restricts access to the user device by restricting access to any function of the user device, to access to a specific application of a plurality of applications available on the user device or specific functions (e.g., the ability to make payments) within one or more applications, will benefit from the teachings provided herein and will fall within the scope of the present disclosure.

The method 100 begins at block 102 where an authentication passcode input is received through an input device of the user device from a first user. In an embodiment, the first user is a primary user of a user device that includes the input device. For example, the user device may be a mobile user device of the first user such as a mobile phone, a tablet computer, a desktop computer, and/or a variety of other user devices known in the art. In other embodiments, the first user may be one of several users that use the user device (e.g., the user device may be shared device that does not have a primary user). In some embodiments, any use of the user devices may be restricted to authorized users such that a user authentication passcode must be provided to access the operating system of the user device. In other embodiments, use of the user device (e.g., access to the operating system of the user device) may be allowed without a user authentication passcode, but use of one or more applications on the user device, or use of particular functions (e.g., payment functions) within one or more applications, may be restricted to authorized users such that a user authentication passcode must be provided to access those applications for functions. In some embodiments, both access to the user device (e.g., the operating systems) and one or more other applications available on the user device may be restricted, and may require different user authentication passcodes (e.g., user device access may require a first user authentication passcode, and a payment application for payment function within an application may require a second user authentication passcode that is different from the first user authentication passcode).

Thus, the user device may include a database (or be connected to a database through a network) that includes one or more user authentication passcodes for accessing the one or more applications on the user device. For example, a user may provide a user authentication passcode for accessing the operating system of the user device, which may include any alphanumeric characters (e.g., a string of numbers provided on a number key display on the user device), a sequence of touch inputs provided on a touch grid display on the user device, and/or a variety of other user authentication passcodes known in the art, and that user authentication passcode may be stored in a non-transitory memory in the user device. In another example, a user authentication passcode for accessing a particular application (e.g., an internet browser, a gaming application, a payment application, a financial tracking application, etc.) may be stored in a non-transitory memory in the user device and/or on an application provider device that may connect to the user device over a network (e.g., the Internet). While a few examples have been provided, any manners known in the art for providing and storing user authentication passcodes are envisioned as falling within the scope of the present disclosure.

At block 102, the user provides an authentication passcode input through an input device of the user device, which may include a keyboard, a mouse, a microphone, a touch screen display, and/or a variety of other input devices known in the art. In an embodiment, the authentication passcode input is provided to access the operating system of the user device, and may include a password, an alphanumeric character string, a string of numbers, a plurality of touch gestures (e.g., a shape, connection of a plurality of dots displayed on a touch input surface, etc.), a spoken command (e.g., received by the user device using voice recognition techniques known in the art), and/or a variety of other authentication passcode inputs known in the art. In another embodiment, the user device may be providing access to the operating system on the user device, and the authentication passcode input is provided to access an application (or function within an application) on the user device available through use of the operating system, and may include a password, an alphanumeric character string, a string of numbers, a plurality of touch gestures (e.g., a shape, connection of a plurality of dots displayed on a touch input surface, etc.), a spoken command (e.g., received by the user device using voice recognition techniques known in the art), and/or a variety of other authentication passcode inputs known in the art. While a few examples of authentication passcode inputs have been provided, any type and manner of providing authentication passcode inputs are envisioned as falling within the scope of the present disclosure.

The method 100 then proceeds to block 104 where the first user is authenticated in response to the authentication passcode input matching a user authentication passcode. In an embodiment, at block 104, an authentication engine in the user device compares the authentication passcode input received at block 102 to one or more user authentication passcodes stored in a database (e.g., located in the user device, connected to the user device through a network, etc.) and, in response to that authentication passcode input matching a user authentication passcode, the authentication engine authenticates the first user to access and use the application or applications. For example, the authentication engine may authenticate the first user for access to the operating system on the user device, to an application available through the operating system, and/or to a function available in an application in response to the authentication passcode input received at block 102 matching a user authentication passcode stored in a database accessible by the user device.

In another embodiment, at block 104, the user device may send the authentication passcode input received at block 102 over the network to an application provider or other system provider device, and that application provider device or other system provider device may compare the authentication passcode input to one or more user authentication passcodes stored in a database. In response to that authentication passcode input matching a user authentication passcode, the application provider device or other system provider device may send an authentication confirmation back over the network such that the authentication engine in the user device authenticates the first user to access and use the application, applications, or application functions. For example, the application provider device or other system provider device, along with the user device, may operate to authenticate the first user for access to the operating system on the user device, to an application available through the operating system, and/or to a function in an application in response to the authentication passcode input received at block 102 matching a user authentication passcodes stored in a database accessible by the application provider device or other system provider device. While a few examples have been provided, any systems and methods for authenticating a user to access an application via an authentication passcode input provided through an input device of a user device are envisioned as falling within the scope of the present disclosure.

Thus, following block 104, the first user has been provided access to the user device (e.g., through the authorization for the user to access the operating system on the user device), access to an application on the user device (e.g., access to an Internet browser application, payment application, gaming application, financial tracking application, or other application known in the art), access to an application function of an application on the user device (e.g., access to a payment function within an application or available through an Internet browser application), access to a network, and/or a variety of other accesses known in the art. As is known in the art, authenticated access to applications as described above may be associated with an authentication time period in which a user is allowed access to the application or applications. The length of the authentication time period may vary depending on the level of security desired for the application, and any time period length is envisioned as falling within the scope of the present disclosure.

Furthermore, in some embodiments, rather than referring strictly to an amount of time, an authentication time period may also refer to a time period defined by user actions occurring subsequent to the authentication of the first user and authorization to access the application. For example, the authentication time period may be an undefined time period (e.g., at the time the first user is first authenticated) that is defined by the user closing the application, causing the application to be moved to the "background" of the operating system (e.g., by opening another, different application), allowing or causing the user device to enter a sleep mode, powering off the user device, and/or performing a variety of other user actions known in the art that cause an authentication time period to end. As such, the authentication time period may end after a predetermined amount of time, following a user action that is defined to end the authentication time period, and/or in response to a variety of other authentication time period characteristics known in the art.

The method 100 then proceeds to block 106 where authentication factors are detected. In an embodiment, the user device includes an non-transitory memory that includes instruction that, when executed by one or more hardware processors in the user device, cause the one or more hardware processors to provide an authentication engine that is configured to detect authentication factors that may be used to extend the authentication time period in which the first user or another user is allowed access to one or more applications on the user device following the initial authentication of the first user at block 104. In some embodiments, the authentication engine is coupled to one or more sensors on the user device to receive sensor signal authentication factors, while in other embodiments, user instructions that are provided to the user device for a non-authentication primary purpose may be received and interpreted as authentication factors. A few examples of detected authentication factors are provided below, but one of skill in the art in possession of the present disclosure will recognize that a wide variety of authentication factors that are not an authentication passcode input provided by a user through an input device on the user device will fall within the scope of the present disclosure.

Figure 2:
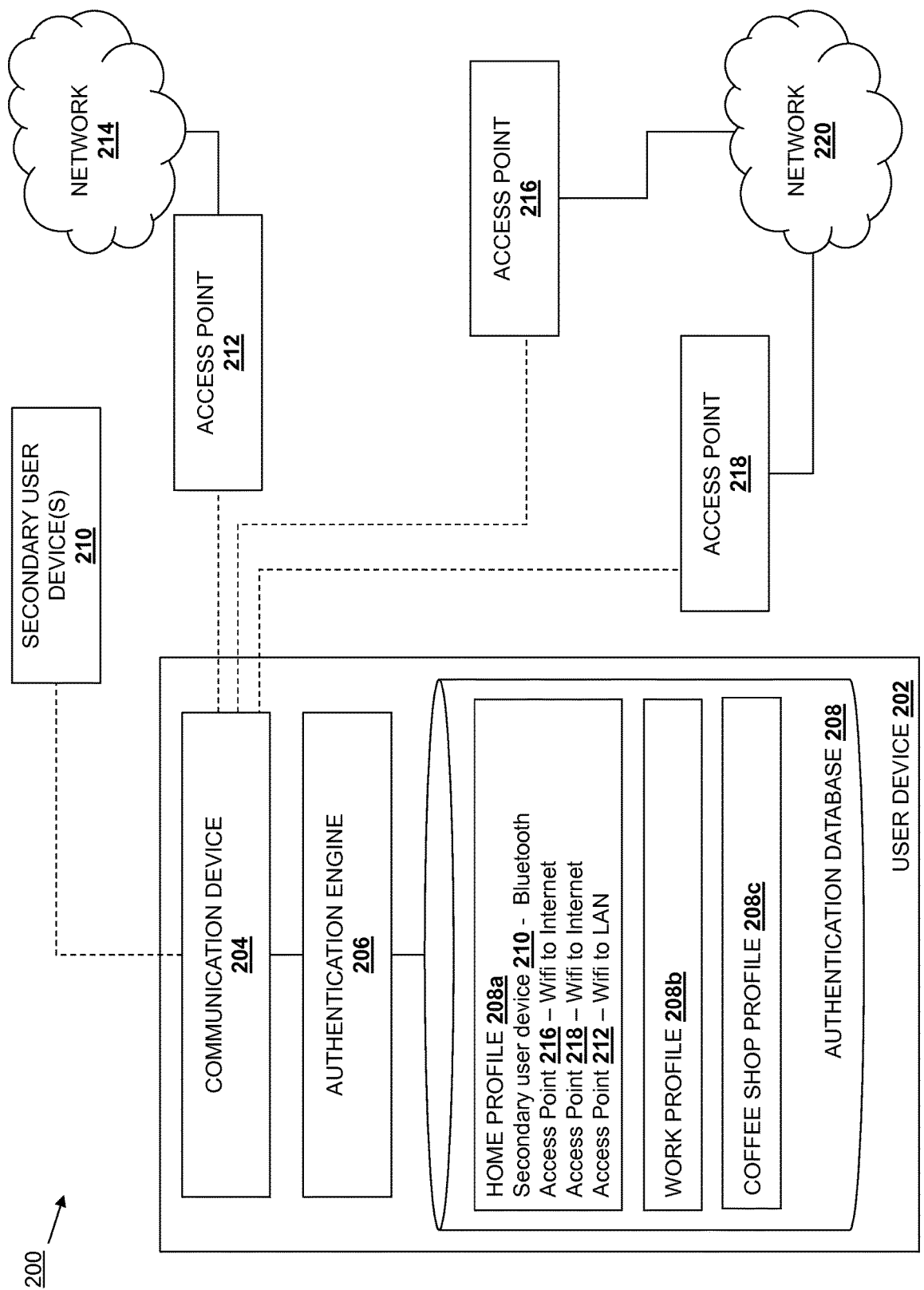
FIG. 2 is a schematic view illustrating an embodiment of an authentication system detecting authentication factors for authenticating a user.

Referring first to FIG. 2, an embodiment of an authenticating system 200 is illustrated and includes a user device 202 that may be the user device for which the first user was authenticated for at block 104, or that includes an application or application function for which the first user was authenticated for at block 104. The user device 200 includes a communication device 204 such as, for example, one or more wireless controllers (e.g., a Bluetooth® wireless controller, a Wifi wireless controller, and/or a variety of other wireless controllers known in the art), that is coupled to an authentication engine 206 that is further coupled to an authentication database 208. The authentication database 208 stores a home wireless environment authentication profile 208*a*, a work wireless environment authentication profile 208*b*, and a coffee shop wireless environment authentication profile 208*c*, each of which includes one or more wireless environments as illustrated and discussed in further detail below for the home wireless environment authentication profile 208*a* with regard to decision block 108. The communication device 204 in the user device 202 is in communication with a secondary user device(s) 210, an access point 212 that is further coupled to a network 214 (a local area network (LAN) in the illustrated embodiment), and access points 216 and 218 that are further coupled to a network 220 (the Internet in the illustrated embodiment).

In the illustrated embodiment, at block 106, the communication device 204 in the user device 202 communicates with each of the secondary user device(s) 210, along with the access points 212, 216, and 218 and, in response, the authentication engine 206 detects a plurality of authentication factors that include a Bluetooth® wireless environment provided by the secondary user device(s) 210, a first Wifi wireless environment provided by the access point 212, a second Wifi wireless environment provided by the access point 216, and a third Wifi wireless environment provided by the access point 218. While four wireless environments are illustrated in FIG. 2 as being detected as authentication factors at block 106, one of skill in the art in possession of the present disclosure will recognize that any number of wireless environments provided using any type of wireless technology may be detected by the authentication engine 206 based on communications by the communication device 204.

Referring now to FIGS. 3a, 3b, 3c, and 3d, an embodiment of an authenticating system is illustrated that is included in a user device 300 that may be the user device for which the first user was authenticated for at block 104, or that includes an application or application function for which the first user was authenticated for at block 104. The user device 300 of the illustrated embodiment is a tablet computer that includes a chassis 302 that houses a touch screen display with a touch screen surface 304. An authentication engine 306 is coupled to the touch screen surface 304 and to an authentication database 308. The authentication database 308 stores a first user touch input authentication profile 308a and a second user touch input authentication profile 308b, each of which details one or more touch inputs, touch input sequences, and/or other touch input information as illustrated and discussed in further detail below.

Figure 3A:
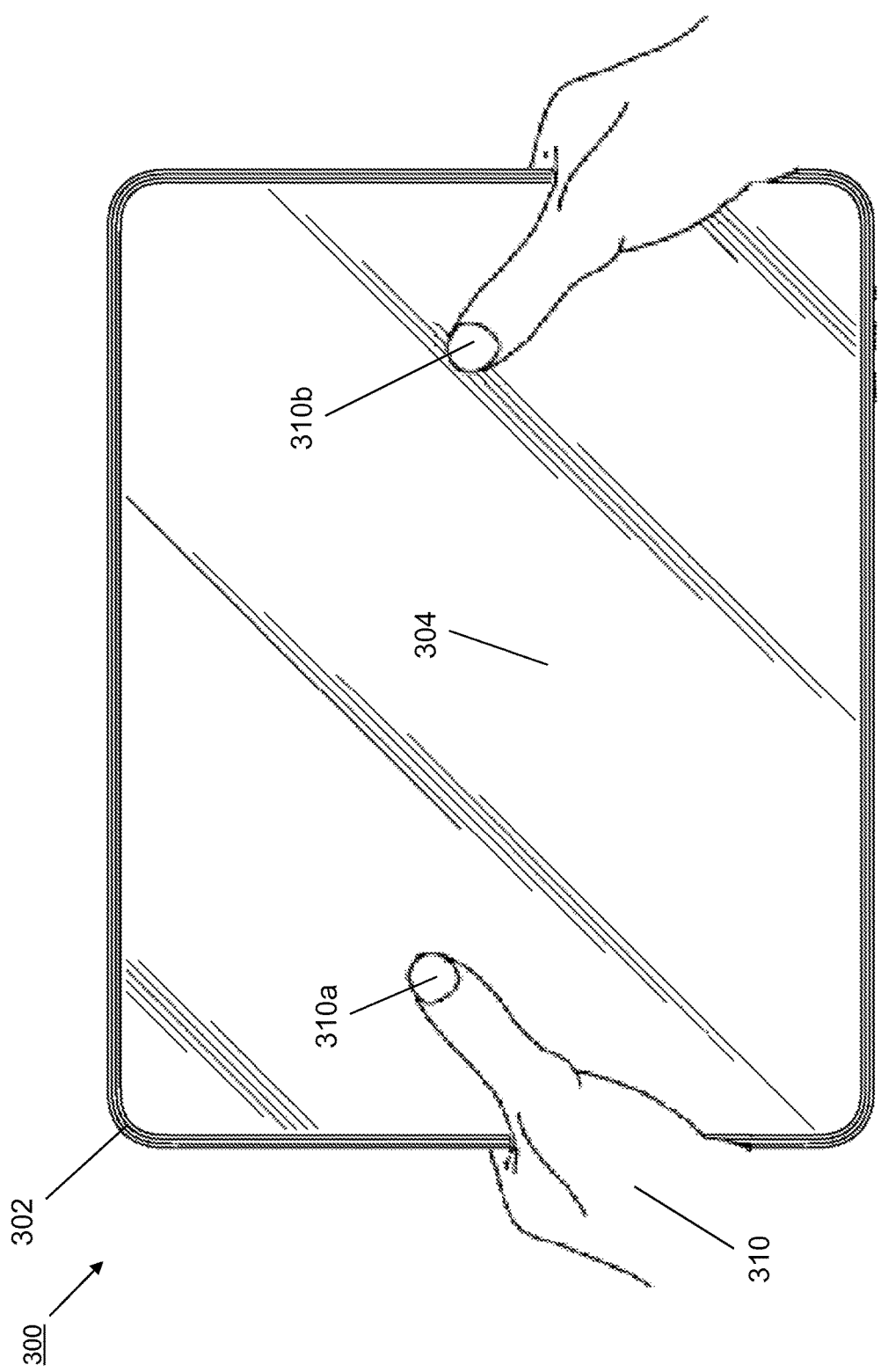
FIG. 3a is a front view illustrating an embodiment of a user operating a user device.
Figure 3B:
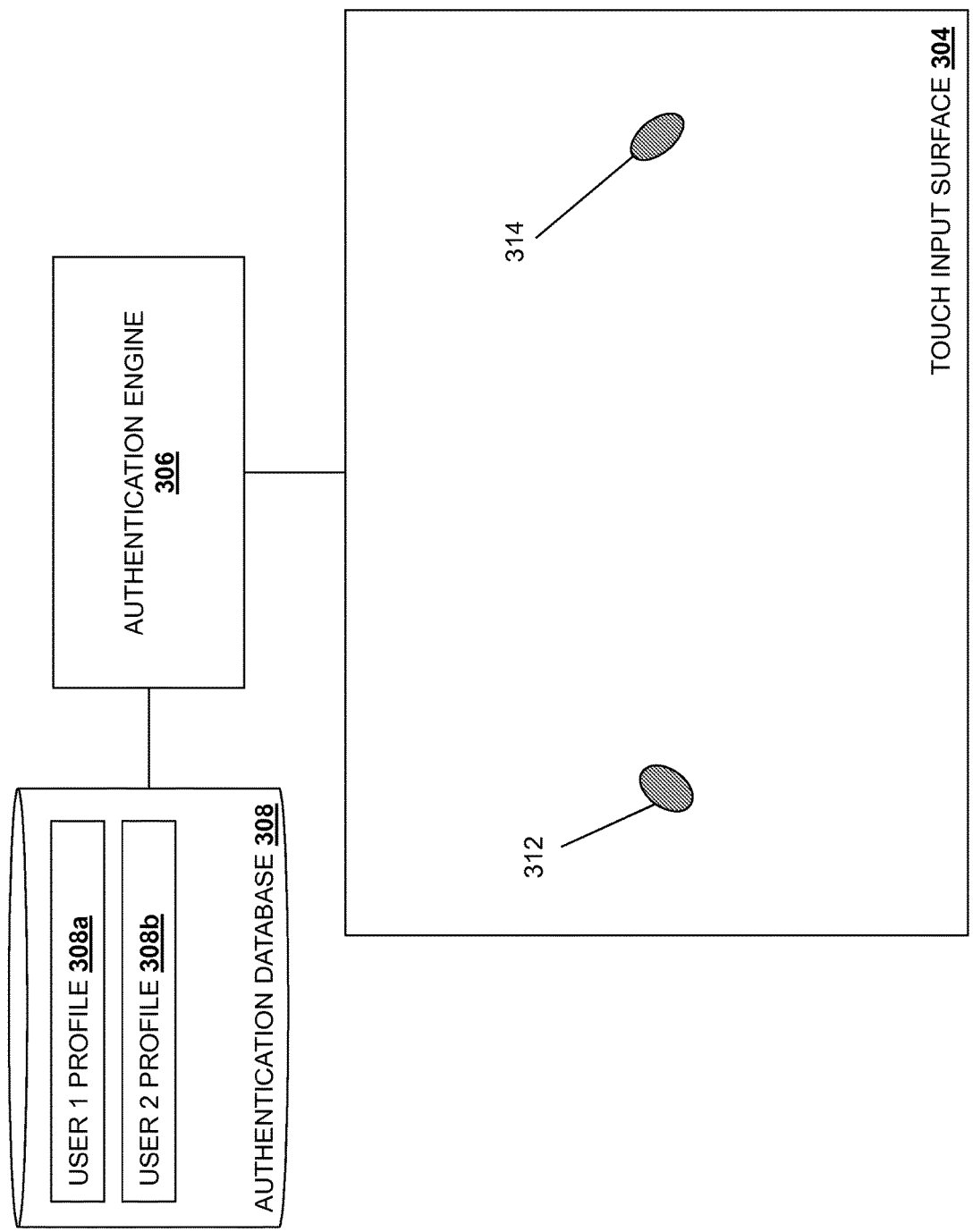
FIG. 3b is a schematic view illustrating an embodiment of a user providing authentication factors on a user device.
Figure 3D:
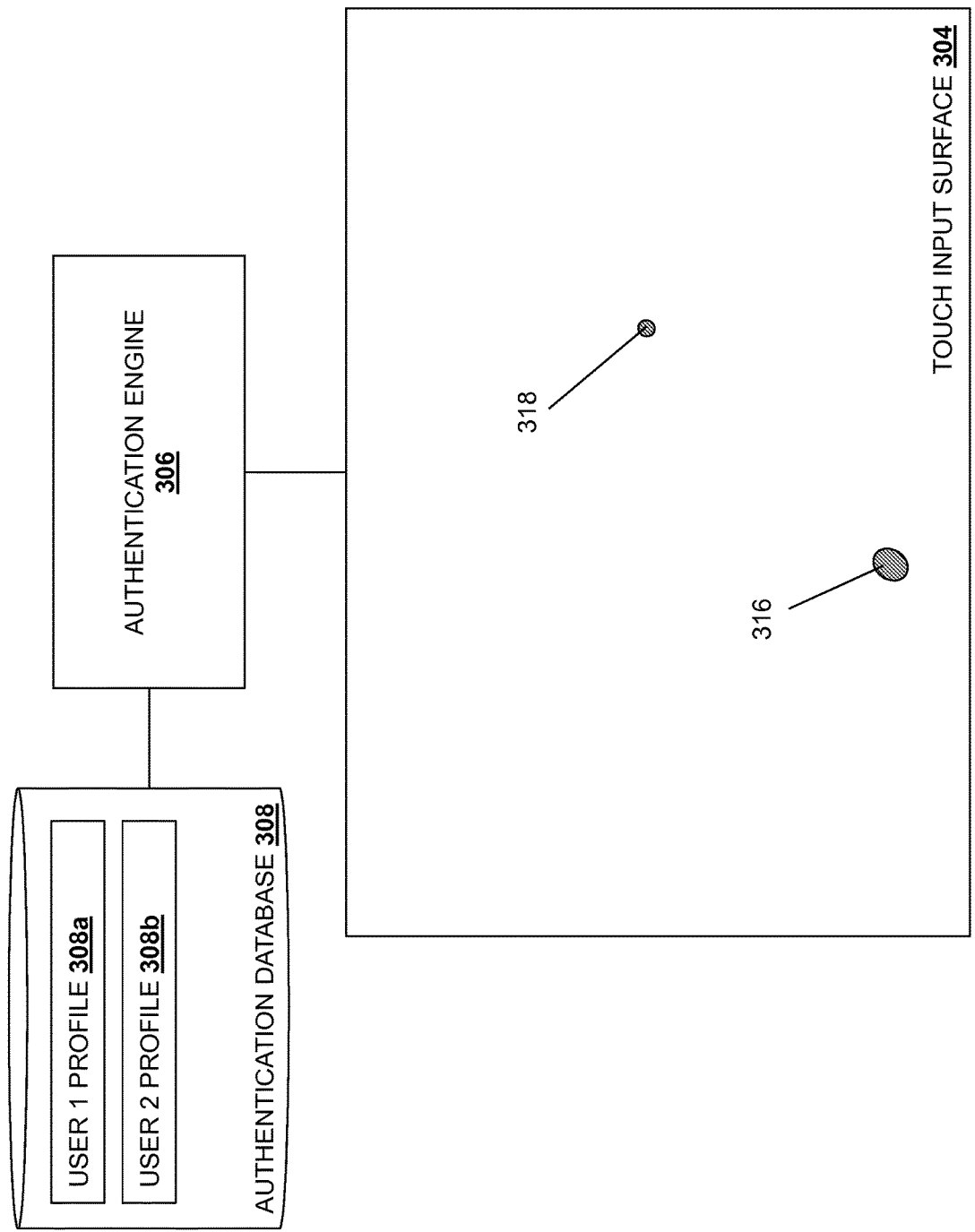
FIG. 3d is a schematic view illustrating an embodiment of a user providing authentication factors on a user device.

In the illustrated embodiment, at block 106, a user 310 uses the user device 300 by engaging their fingers 310a and 310b with the touch screen surface 304, as illustrated in FIG. 3a, such that the authentication engine 306 detects a plurality of authentication factors that include a first detected touch input 312 and a second detected touch input 314, as illustrated in FIG. 3b, as well as movement of those detected touch inputs (as illustrated in FIG. 3c for the second detected touch input 314). FIG. 3d illustrates a first detected touch input 316 and a second detected touch input 318 detected by the authentication engine 306 that may be provided by a user that is different from the user that provided the first detected touch input 312 and the second detected touch input 314 illustrated in FIGS. 3a, 3b, and 3c. For example, the first detected touch input 312 and the second detected touch input 314 illustrated in FIGS. 3a, 3b, and 3c may be provided by a parent user, while the first detected touch input 316 and the second detected touch input 318 illustrated in FIG. 3d may be provided by a child user (as depicted by the smaller area of the touch inputs illustrated in FIG. 3d relative to those illustrated in FIGS. 3b and 3c, and/or other factors discussed in further detail below). While two different users providing touch inputs are illustrated in FIGS. 3a, 3b, 3c, and 3d that are detected as authentication factors at block 106, one of skill in the art in possession of the present disclosure will recognize that any number of users may provide touch inputs that may be detected by the authentication engine 206.

Figure 4:
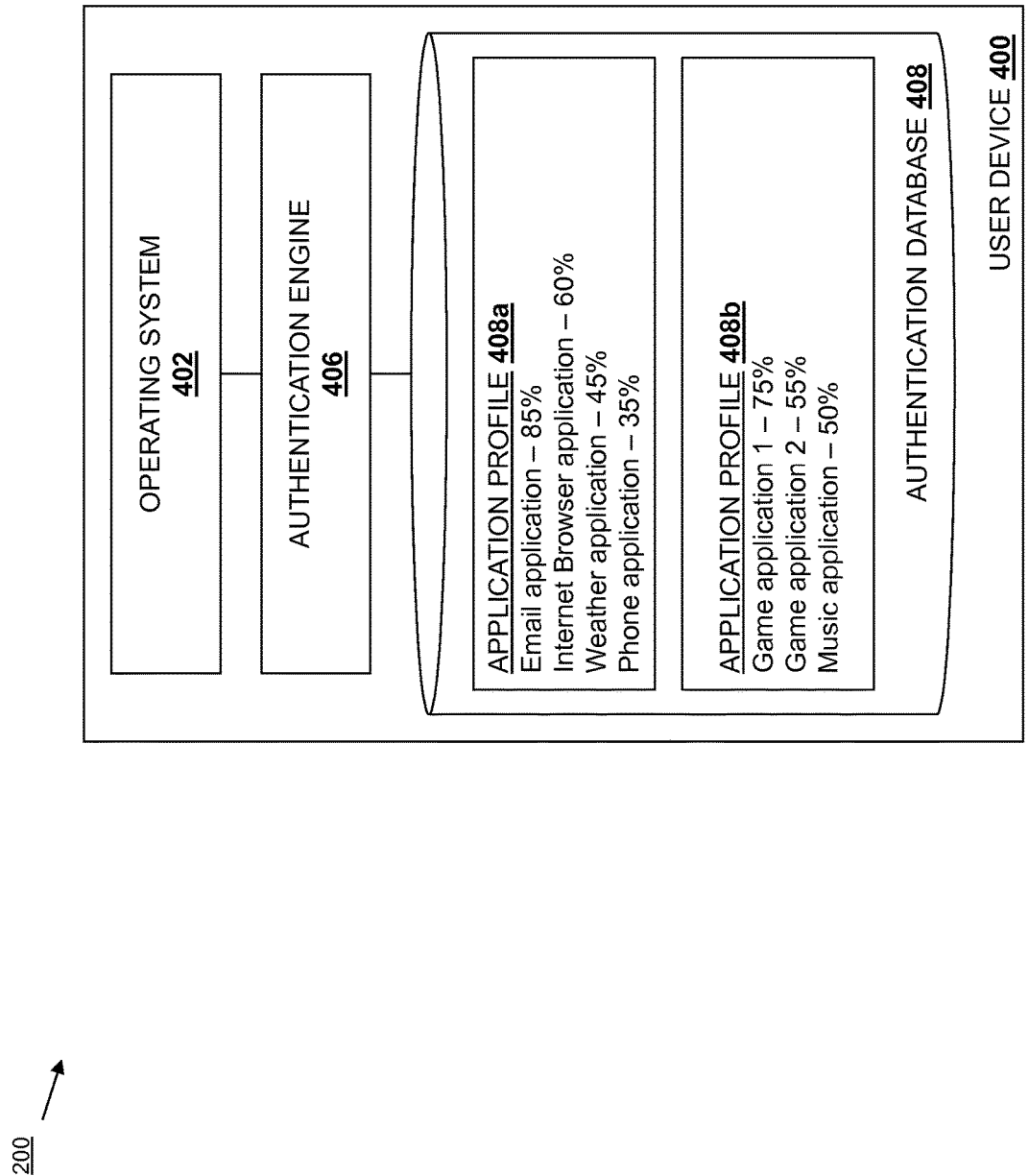
FIG. 4 is a schematic view illustrating an embodiment of an authentication system including authentication profiles for authenticating a user.

Referring now to FIG. 4, an embodiment of an authenticating system is illustrated that is included in a user device 400 that may be the user device for which the first user was authenticated for at block 104, or that includes an application or application function for which the first user was authenticated for at block 104. The user device 400 includes an operating system 402 that is coupled to an authentication engine 406 that is further coupled to an authentication database 408. The authentication database 408 stores a first application use authentication profile 408a and a second application use authentication profile 408b, each of which includes one or more application use details as illustrated and discussed in further detail below with regard to decision block 108.

In the illustrated embodiment, at block 106, the operating system 402 in the user device 400 communicates application use to the authentication engine 406. For example, the operating system 402 may provide information to the authentication engine 406 about one or more applications launched or closed, a time spent using one or more applications, and/or a variety of other application use details known in the art, and the authentication engine 406 detects those application use details as a plurality of authentication factors that include which applications are being used, how those applications are being used, etc.

While a few examples of detected authentication factors have been provided, other authentication factors may be detected at block 106 that may be used to extend the authentication time period that a user is allowed to access an application on the user device. For example, any sensors on the on the user device may be used to detect authentication factors, including cameras to capture images or video, accelerometers to detect motion, microphones to detect sound, location determination devices to detect a current location, temperature sensors to detect heat signatures, and/or a variety of other sensors known in the art. In addition, any of those sensor-detected authentication factors, along with any of the authentication factors described above with reference to FIGS. 2, 3a-d, and 4, may be detected in combination at block 106 and combined or used together in further blocks of the method 100 to provide further security when automatically authenticating the user to extend the authentication time period that a user is allowed to access an application on the user device.

The method 100 then proceeds to decision block 108 where it is determined whether the detected authentication factors match an authentication profile. In an embodiment, a database of the user device and/or a database coupled to the user device (e.g., through a network) may include one or more authentication profiles that each include a plurality of authentication factors. In some embodiments, the authentication factors included in the authentication profiles may be provided by the user. For example, a user of the user device (e.g., the first user discussed above) may select or provide one or more authentication factors for an authentication profile that may include, for example, one or more wireless environments in one or more locations that the user typically uses the user device, touch inputs, application use profiles, images of authorized users, voice samples of authorized users, location information (e.g., location coordinates, addresses, etc.) that the user typically uses the user device, and/or any other authentication factor discussed herein.

In some embodiments, the authentication factors included in the authentication profiles may be provided by the user device. For example, a user device may automatically determine one or more authentication factors for an authentication profile that may include, for example, one or more wireless environments in one or more locations that the user device is commonly located at, touch inputs that are commonly used on the user device, application use profiles for applications used on the user device, images captured of users that typically use the user device, voice samples of users that typically use the user device, locations that the user device is typically located in, and/or any other authentication factor discussed herein. In other words, the user device may be configured to recognize factors (e.g., wireless environments, touch inputs, application uses, images, voices, locations, etc.) that are often associated with an authenticated user (e.g., that user entering an authentication passcode input that is authenticated with a user authentication passcode) and that indicate that the user device, application, or application function is being used by an authorized user, and save those authentication factors as an authentication profile. In a specific example, a user device in an authorized user's home location may detect the same wireless environments that are typically present at the home location (e.g., a wireless environment provided by an access point of that user, a wireless environment provided by another device of that user, wireless environments provided by neighbors of that user). Thus when those wireless environments are detected, it can be assumed that that authorized user is using the user device rather than an unauthorized user that has stolen the user device (as an unauthorized user that has stolen the user device will not typically try to use it in the authorized users home).

In some embodiments, authentication factors for an authentication profile may be automatically determined by a user device as discussed above and then provided to the user to confirm those authentication profiles. For example, following the detection of the plurality of wireless environments illustrated in FIG. 2 a predetermined number of times, the user device may present a wireless environment authentication profile to the user that includes those wireless environments to allow the user to confirm that that wireless environment authentication profile should be associated with authorized use. Similarly, following the detection of the plurality of touch inputs illustrated in FIGS. 3a-d a predetermined number of times, the user device may present a touch input authentication profile to the user that includes those touch inputs to allow the user to confirm that that touch input authentication profile should be associated with authorized use. Similarly, following the detection of the same type of application use illustrated in FIG. 4 a predetermined number of times, the user device may present an application use authentication profile to the user that includes those application uses to allow the user to confirm that that application use authentication profile should be associated with authorized use. The user device may also present images of users captured a predetermined number of times, voice recordings of users captured a predetermined number of times, locations determined a predetermined number of times, and/or any other authentication factor to the user for confirmation as an authentication profile or part of an authentication profile.

At decision block 108, the authentication engine compares the authentication factors received at block 106 to the authentication profile(s) in the user device to determine whether a match exists. In some embodiments, decision block 108 may be performed upon expiration of the authentication time period (provided in response to the authentication of the first user at block 104). In some embodiments, decision block 108 may be performed a predetermined time before the authentication time period expires. In other embodiments, decision block 108 may be performed throughout the authentication time period.

Referring back to FIG. 2, at decision block 108, the authentication engine 206 compares the authentication factors that include the detected wireless environments discussed with reference to block 106 to the authentication profiles in the authentication database 208 that include the home wireless environment authentication profile 208a, the work wireless environment authentication profile 208b, and the coffee shop wireless environment authentication profile 208c. If the detected wireless environments discussed with reference to block 106 do not match any of the wireless environments in the home wireless environment authentication profile 208a, the work wireless environment authentication profile 208b, or the coffee shop wireless environment authentication profile 208c, the method 100 proceeds to block 110 where an authentication passcode input is requested. In an embodiment of block 110, the authentication engine 206 has determined that the current wireless environments detected by the communication device 204 in the user device 202 do not match any known wireless environments defined by the authentication profiles in the authentication database, and thus following the end of the authentication time period provided in response to the authentication of the first user at block 104, access to the one or more applications or application functions on the user device 202 is restricted and the user must provide an authentication passcode input that matches a user authentication passcode as described above for blocks 102 and 104 in order to re-access the one or more applications or application functions. If the detected wireless environments discussed with reference to block 106 match the wireless environments in any of the home wireless environment authentication profile 208a, the work wireless environment authentication profile 208b, or the coffee shop wireless environment authentication profile 208c, the method 100 proceeds to decision block 112, discussed in further detail below.

Referring back to FIGS. 3a-d, at decision block 108, the authentication engine 306 compares the authentication factors that include the detected touch inputs, sequences of detected touch inputs, and other detected touch input information discussed with reference to block 106 to the authentication profiles in the authentication database 308 that include the first user touch input authentication profile 308a and the second user touch input authentication profile 308b. If the detected touch inputs, sequences of detected touch inputs, and other detected touch input information discussed with reference to block 106 do not match any of the first user touch input authentication profile 308a and the second user touch input authentication profile 308b, the method 100 proceeds to block 110 where an authentication passcode input is requested. In an embodiment of block 110, the authentication engine 306 has determined that the touch inputs being provided on the user device 300 does not match any known touch input, sequences of touch inputs, and other touch input information defined by the authentication profiles in the authentication database 308, and thus following the end of the authentication time period provided in response to the authentication of the first user at block 104, access to the one or more applications or application functions on the user device 300 is restricted and the user must provide an authentication passcode input that matches a user authentication passcode as described above for blocks 102 and 104 in order to re-access the one or more applications or application functions. If the detected touch inputs, sequences of detected touch inputs, and other detected touch input information discussed with reference to block 106 match any of the first user touch input authentication profile 308a and the second user touch input authentication profile 308b, the method 100 proceeds to decision block 112, discussed in further detail below.

Referring back to FIG. 4, at decision block 108, the authentication engine 406 compares the authentication factors that include the detected application use details discussed with reference to block 106 to the authentication profiles in the authentication database 308 that include the first application use authentication profile 408a and the second application use authentication profile 408b. If the detected application use discussed with reference to block 106 do not match any of the first application use authentication profile 408*a* and the second application use authentication profile 408*b*, the method 100 proceeds to block 110 where an authentication passcode input is requested. In an embodiment of block 110, the authentication engine 406 has determined that the application use details being provided on the user device 400 do not match any known application use details defined by the authentication profiles in the authentication database 408, and thus following the end of the authentication time period provided in response to the authentication of the first user at block 104, access to the one or more applications or application functions on the user device 400 is restricted and the user must provide an authentication passcode input that matches a user authentication passcode as described above for blocks 102 and 104 in order to re-access the one or more applications or application functions. If the detected application use discussed with reference to block 106 matches any of the first application use authentication profile 408*a* and the second application use authentication profile 408*b*, the method 100 proceeds to decision block 112, discussed in further detail below.

With regard to the examples of other authentication factors that may be detected at block 106, at block 108 the authentication engine may compare a captured image (e.g., of a current user of the user device) to one or more images (e.g., of authorized users) in an authentication profile, a captured voice recording (e.g., of a current user of the user device) to one or more voice samples (e.g., of authorized users) in an authentication profile, a detected location (e.g., of a current location of the user device) to one or more locations (e.g., of authorized locations of the user device) in an authentication profile, etc. If no match is determined at block 108, an authentication passcode input is requested at block 110 as discussed above, while if a match is determined, the method 100 proceeds to decision block 112. As discussed above, any or all of the examples of authentication factors in authentication profiles may be combined in a single authentication profile that must be matched prior to extending the authentication time period discussed below. As such, the authentication engine may need to determine that any or all of a detected wireless environment, detected touch inputs, a detected application use profile, a detected image, a detected voice recording, and a detected location match any or all of a known wireless environment, a known touch input, a known application use profile, a known image, a known voice recording, and a known location in an authentication profile in the authentication database.

At decision block 112, the authentication engine determines whether the authentication profile, which was determined at decision block 108 to match the authentication factors detected at block 106, is associated with the first user that was authenticated at block 104 or a second user. In some embodiments of the method 100, the authentication profiles may only be associated with a single user. In such embodiments, decision block 112 may be skipped and the method 100 may proceed from decision block 108 to block 114 where the authentication time period for the first user is extended, discussed in further detail below. Similarly, in embodiments where authentication profiles are provided for more than one user, if the authentication profile is determined at decision block 108 to be associated with the first user, the method 100 proceeds from decision block 112 to block 114 where the authentication time period for the first user is extended. Extension of the authentication time period allows the first user continued access to one or more applications or application functions on the user device. For example, the extended authentication time period may allow the first user to continue to use the user device (e.g., by allowing access to the operating system on the user device) without providing an authentication passcode input on an input device of the user device. In another example, the extended authentication time period may allow the first user to continue to use an application on the user device (e.g., by allowing access to an application provided through the operating system on the user device) without providing an authentication passcode input on an input device of the user device. In another example, the extended authentication time period may allow the first user to continue to use an application function (e.g., the ability to make payments using a payment account) within an application on the user device (e.g., by allowing access to a payment function provided in an application accessible through the operating system on the user device) without providing an authentication passcode input on an input device of the user device.

If the authentication profile, which was determined at decision block 108, is determined at decision block 112 to be associated with a second user that is different than the first user, the method 100 may proceed to optional block 116 where an authentication level is changed according to the authentication profile, and/or to block 118 where the authentication time period for the second user is extended. As discussed above, authentication profiles may be provided for more than one users (e.g., different authentication profiles may be provided for each of a parent user and a child user), and those authentication profiles may also be associated with different access levels. In an embodiment, an authentication profile for a parent user may provide that parent user with full use of the user device, applications on the user device, and/or application functions within an application on the user device, while an application profile for a child user may provide that child user with restricted access to the user device, applications on the user device, and/or application functions within an application on the user device.

For example, restricted access to a user device, applications on the user device, and/or application functions within an application on the user device may include an inability to access particular applications (e.g., a phone application, an email application, a payment application, a financial tracking application, an application with adult content, etc.), the inability to use certain features on applications (e.g., making a payment within an application, accessing particular web sites in an Internet browser application, viewing particular photos in a photo application, etc.), and/or a variety of other user device or application restrictions known in the art. In some embodiments, reduced access to a payment application or payment feature may include a reduction in the amount that may be charged using a payment application. For example, a parent user may have the ability to charge any amount using a payment application, while a child user may be restricted to a lower amount relative to the parent user that they may charge using the payment application. While a few examples have been provided, one of skill in the art in possession of the present disclosure will recognize that any forms of restricted access will fall within the scope of the present disclosure.

Referring back to FIG. 2, an embodiment of authentication profiles associated with only a single user is illustrated. Thus, at block 108 the authentication engine 206 may determine that the detected wireless environments provided by the secondary user device(s) 210 and the access points 212, 216, and 218 match the home wireless environment authentication profile 208*a* which, in the illustrated embodiment, details the secondary user device 210 providing a Bluetooth environment, the access point 212 providing a Wifi to LAN wireless environment, and each of the access points 216 and 218 providing Wifi to Internet wireless environments. In response, the method 100 proceeds to block 114 where the authentication time period for the first user is extended such that the user may continue using the user device 202, one or more applications on the user device 202, and/or functions in the application without providing an authentication passcode input through an input device on the user device 202. While a simplified version of wireless environment details for home wireless environment authentication profile 208a have been provided, other details such as, for example, wireless network names, MAC addresses, wireless signal strengths, and/or other wireless environment characteristics known in the art may be used to recognize the wireless environments in a wireless environment authentication profile. Similarly, the work wireless environment authentication profile 208b and the coffee shop wireless environment authentication profile 208c may allow authentication time periods for the user device and/or applications to be extended substantially as described above when the user is a work or in a coffee shop they visit regularly (or have otherwise authorized for continuous authorization).

While not illustrated, wireless environment authentication profiles similar to those illustrated in FIG. 2 may be used to change authentication levels similarly as described herein with reference to method blocks 112, 114, 116, and 118. In some embodiments, the different wireless environment authentication profiles may result in different authentication levels. For example, authentication level for the coffee shop wireless environment authentication profile 208c may be restricted relative to the authentication level of the home wireless environment authentication profile 208b (e.g., payments may be transacted using applications at home but not at the coffee shop), which may be restricted relative to the authentication level of the work wireless environment authentication profile 208a (e.g., a work network may be accessible at work but not at home or the coffee shop.) In some embodiments, the user device 202 may be shared by users, and thus a wireless environment associated with a first user (e.g., in a first work location or at the first users home) may be provided a first authentication level, while a wireless environment associated with a second user (in a second work location that is different than the first work location or at the second users home) may be provided a second authentication level that is different from the first authentication level.

Thus, an authentication time period in which a user is allowed access to a user device, application, or application function or feature may be extended based on the detection of a plurality of wireless environments and without any input from the user. It has been found that because users typically use their user device in the same location or locations, the authentication systems and methods described herein may be used to allow for authentication time periods to be extended when a user device is determined to be located in one of those locations based on detected wireless environments that are commonly present at those locations. In the event the user device is stolen, it becomes highly unlikely that the user device will be located on one of those locations such that the same plurality of wireless environments (e.g., providing the same wireless technology, having the same wireless environment names, having the same respective wireless environment strengths, being associated with the same MAC addresses, etc.) are detected, and thus continuous authentication in those locations may provide a much lower risk when those wireless environments are detected.

Referring back to FIGS. 3a-d, an embodiment of authentication profiles associated with multiple users is illustrated. In one embodiment, at block 108 the authentication engine 306 may determine that the detected touch inputs provided on the touch input surface 304 match an authentication profile in the authentication database 308. In response, the method 100 proceeds to block 112 where the authentication engine 306 determines that the authentication profile, which was determined at decision block 108, is the first user authentication profile 308a which, in the illustrated embodiment, details the touch inputs, sequence of touch inputs, and/or other touch information associated with the first user illustrated in FIGS. 3a, 3b, and 3c, and the method 100 proceeds to block 114 where the authentication time period for the first user is extended such that the user may continue using the user device 300, one or more applications on the user device 300, and/or application features of the application on the user device 300 without providing an authentication passcode input through an input device on the user device 300.

In another embodiment, at block 112 the authentication engine 306 may determine that the authentication profile, which was determined at decision block 108, is the second user authentication profile 308b which, in the illustrated embodiment, details the touch inputs, sequence of touch inputs, and/or other touch information associated with a second user illustrated in FIG. 3d, and the method 100 proceeds to block 116 where the authentication level is changed according to the authentication profile, and the authentication time period is extended for the second user such that the second user may continue using the user device 400, one or more applications on the user device 400, and/or application features of the application on the user device 400 without providing an authentication passcode input through an input device on the user device 400.

Thus, an authentication time period in which a user is allowed access to a user device, application, or application feature may be extended based on the detection of a plurality of touch inputs provided during non-authenticating uses (e.g., browsing the Internet, emailing, watching a video, etc.) and without any input from the user. During use of their user device, a user may provide touch inputs, sequences of touch inputs, and other touch input information that is distinguishable from other users (e.g., based on finger size, pressure, and/or other capacitance measurements made by the touch input surface 304; based on touch inputs that indicate a common manner of holding the user device; and/or based on common touch gestures used by a user; etc.) and the authentication systems and methods described herein allow for authentication time periods to be extended when user touch inputs on a user device area determined to be associated with an authorized user. Furthermore, touch inputs from a first user may result in a first level of access to the user device and/or applications on the user device, while touch inputs from a second user may result in a second level of access to the user device and/or applications on the user device that is different from the first level of access. In the event the user device is stolen, it becomes highly unlikely that the unauthorized user will provide touch inputs with the same finger size, pressure, indications of the same manner of holding the device, and common touch gestures as an authorized user, and thus continuous authentication may provide a much lower risk when those recognized touch inputs are detected.

Referring back to FIG. 4d, an embodiment of authentication profiles associated with multiple users is illustrated. In one embodiment, at block 108 the authentication engine 406 may determine that the detected application use details provided through the operating system 402 match an authentication profile in the authentication database 408. In response, the method 100 proceeds to block 112 where the authentication engine 406 determines that the authentication profile, which was determined at decision block 108, is the first user application detail authentication profile 408a which may detail the applications most commonly used (as illustrated), the typical sequence of applications used (e.g., an email application first, a financial tracking application second, a gaming application third, and an Internet browsing application fourth, after signing on to the user device 400), features used on the applications, and/or other application use details known in the art that are associated with the first user, and the method 100 proceeds to block 114 where the authentication time period for the first user is extended such that the user may continue using the user device 400, one or more applications on the user device 400, and/or application features of the application on the user device 400 without providing an authentication passcode input through an input device on the user device 400.

In another embodiment, at block 112 the authentication engine 406 may determine that the authentication profile, which was determined at decision block 108, is the second user authentication profile 408b which may detail the applications most commonly used (as illustrated), the typical sequence of applications used, features used on the applications, and/or other application use details known in the art associated with a second user, and the method 100 proceeds to block 116 where the authentication level is changed according to the authentication profile, and the authentication time period is extended for the second user such that the second user may continue using the user device 400, one or more applications on the user device 400, and/or application features of an application on the user device 400 without providing an authentication passcode input through an input device on the user device 400.

Thus, an authentication time period in which a user is allowed access to a user device or application on the user device may be extended based on the detection of a plurality of application use details provided during non-authenticating uses (e.g., browsing the Internet, emailing, watching a video, etc.) and without any authentication passcode input from the user. During use of their user device, a user may launch applications, close applications, use features in applications, and/or perform a variety of other application actions, and the authentication systems and methods described herein allow for authentication time periods to be extended when application use details are determined to be associated with an authorized user. Furthermore, application use details from a first user may result in a first level of access to the user device, applications, or application features, while application use details from a second user may result in a second level of access to the user device, applications, or application features on the user device that is different from the first level of access. In the event the user device is stolen, it becomes highly unlikely that the unauthorized user will applications in the same manner as an authorized user, and thus continuous authentication may provide a much lower risk when those recognized application use details are detected.

Similarly, images captured of a user, voice recordings captured from a user, locations detected, etc. may be used at blocks 112, 114, 116, and 118 of the method to extend authentication time periods for a first user, change authentication levels, and extend authentication time periods for a second user.

Thus, systems and methods for authenticating users have been described that provide for extending authentication time period in which users are provided access to user devices or applications within having to enter authentication passcodes via an input device. The systems and methods create authentication profiles that detail authentication factors that indicate that an authorized user is using the user device or application, and extend the authentication time period in response. Such systems and methods provide for enhanced security while reducing the continuous authentication needed by conventional systems and methods that cannot recognize when the user device or application is being used by an authorized user. Furthermore, the systems and methods provide for changing authentication levels based on particular users that are detected using the authentication factors, allowing security of a user device to be fine-tuned based on which authorized user is using the user device. The systems and methods described herein provide continuous authentication for authorized users when the risk of doing so is low, ending the need for authorized users to continuously authenticate themselves when the risk of the current use of the user device is low.

Figure 5:
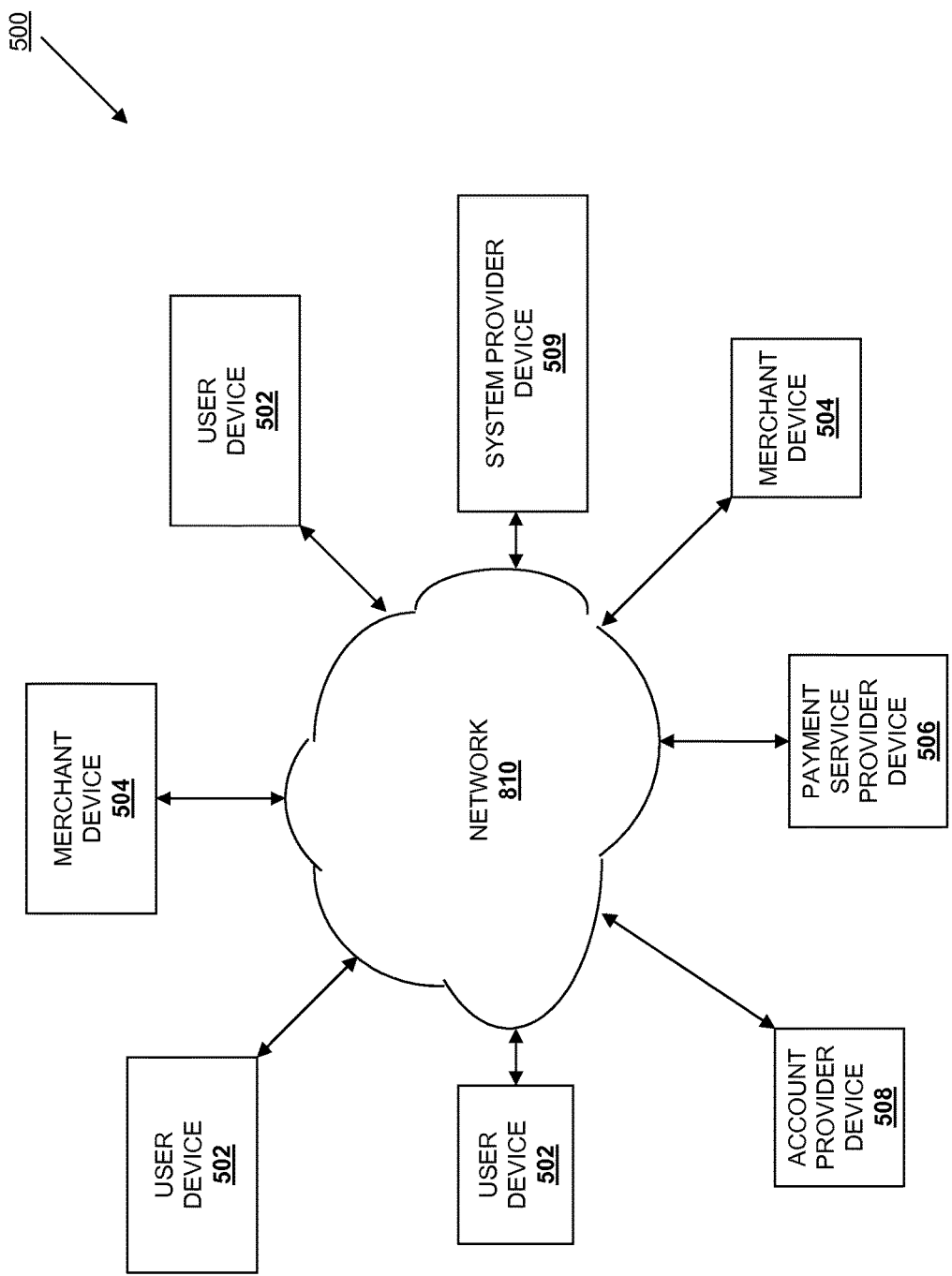
FIG. 5 is a schematic view illustrating an embodiment of a networked system.

Referring now to FIG. 5, an embodiment of a network-based system 500 for implementing one or more processes described herein is illustrated. As shown, network-based system 500 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 5 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 500 illustrated in FIG. 5 includes a plurality of user devices 502, a plurality of merchant devices 504, a payment service provider device 506, an account provider device 508, and/or a system provider device 509 in communication over a network 510. Any of the user devices 502 may be the user device 202, 300, and 400, discussed above. The merchant devices 504 may be the merchant devices discussed above and may be operated by the merchants discussed above to provide payment transactions using a payment application of the user. The payment service provider device 506 may be the payment service provider devices discussed above and may be operated by a payment service provider such as, for example, PayPal Inc. of San Jose, Calif. The account provider device 508 may be the account provider devices discussed above and may be operated by the account providers discussed above such as, for example, credit card account providers, bank account providers, savings account providers, and a variety of other account providers known in the art. The system provider device 509 may be the system provider devices discussed above and may be operated by the system provider discussed above.

The user devices 502, a plurality of merchant devices 504, a payment service provider device 506, an account provider device 508, and/or a system provider device 509 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 500, and/or accessible over the network 510.

The network 510 may be implemented as a single network or a combination of multiple networks. For example, in various embodiments, the network 510 may include the Internet and/or one or more intranets, landline networks, wireless networks, and/or other appropriate types of networks.

The user devices 502 may be implemented using any appropriate combination of hardware and/or software configured for wired and/or wireless communication over network 510. For example, in one embodiment, the user devices 502 may be implemented as a personal computer of a user in communication with the Internet. In other embodiments, the user devices 502 may be a smart phone, personal digital assistant (PDA), laptop computer, tablet computer, and/or other types of computing devices.

The user devices 502 may include one or more browser applications which may be used, for example, to provide a convenient interface to permit the user to browse information available over the network 510. For example, in one embodiment, the browser application may be implemented as a web browser configured to view information available over the Internet.

The user devices 502 may also include one or more toolbar applications which may be used, for example, to provide user-side processing for performing desired tasks in response to operations selected by the user. In one embodiment, the toolbar application may display a user interface in connection with the browser application.

The user devices 502 may further include other applications as may be desired in particular embodiments to provide desired features to the user devices 502. In particular, the other applications may include a payment application for payments assisted by a payment service provider through the payment service provider device 506. The other applications may also include security applications for implementing user-side security features, programmatic user applications for interfacing with appropriate application programming interfaces (APIs) over the network 510, or other types of applications. Email and/or text applications may also be included, which allow the user to send and receive emails and/or text messages through the network 510. The user devices 502 includes one or more user and/or device identifiers which may be implemented, for example, as operating system registry entries, cookies associated with the browser application, identifiers associated with hardware of the user devices 502, or other appropriate identifiers, such as a phone number. In one embodiment, the user identifier may be used by the payment service provider device 506 and/or account provider device 508 to associate the user with a particular account as further described herein.

The merchant devices 504 may be maintained, for example, by a conventional or on-line merchant, conventional or digital goods seller, individual seller, and/or application developer offering various products and/or services in exchange for payment to be received conventionally or over the network 510. In this regard, the merchant devices 504 may include a database identifying available products and/or services (e.g., collectively referred to as items) which may be made available for viewing and purchase by the user.

The merchant devices 504 also include a checkout application which may be configured to facilitate the purchase by the payer of items. The checkout application may be configured to accept payment information from the user through the user device 502, the account provider through the account provider device 508, and/or from the payment service provider through the payment service provider device 506 over the network 510.

Figure 6:
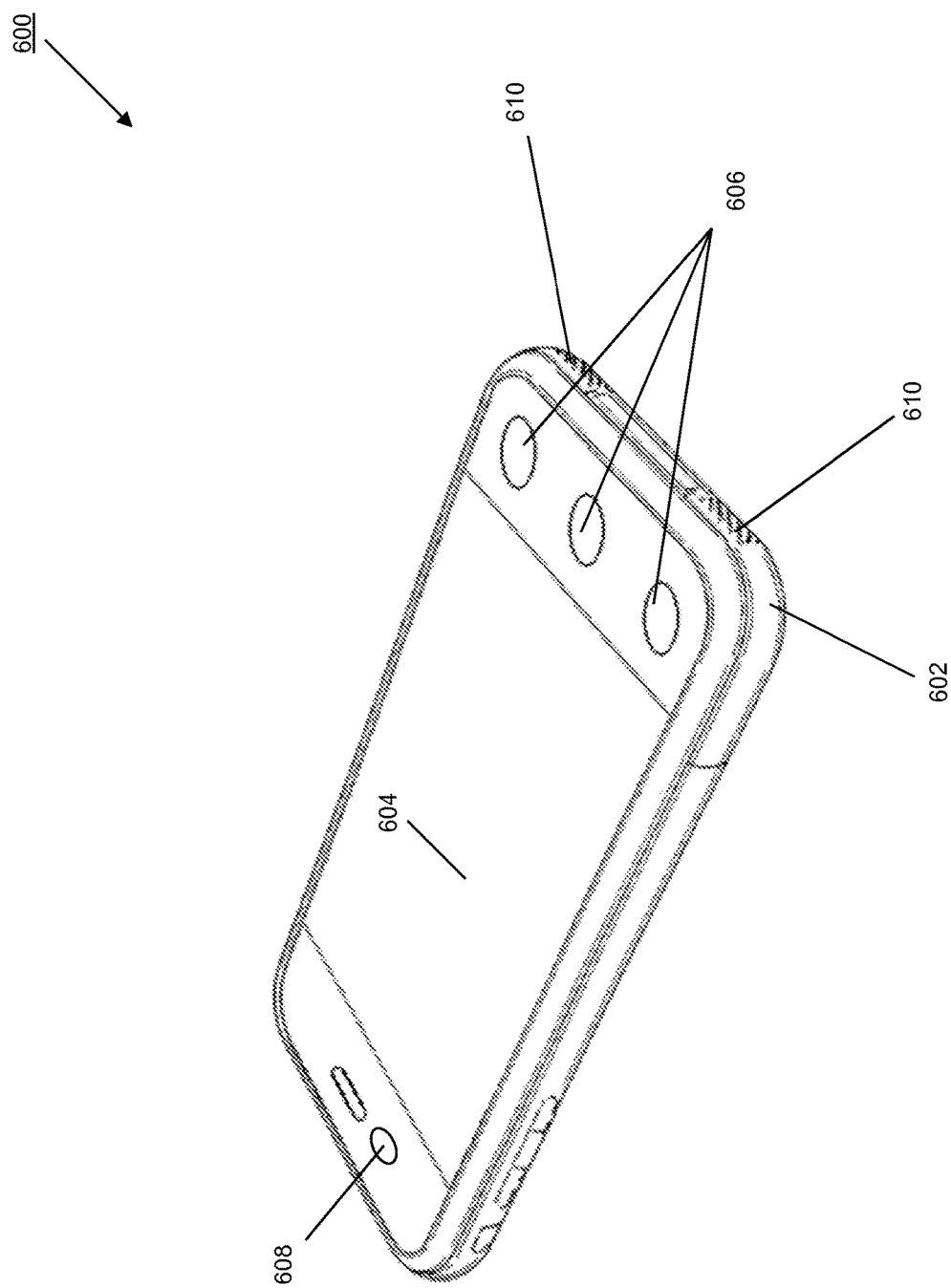
FIG. 6 is a perspective view illustrating an embodiment of a user device.

Referring now to FIG. 6, an embodiment of a user device 600 is illustrated. The user device 600 may be the user devices 202, 300, 400, and/or 502, discussed above. The user device 600 includes a chassis 602 having a display 604 and an input device including the display 604 and a plurality of input buttons 606. One of skill in the art will recognize that the user device 600 is a portable or mobile phone including a touch screen input device and a plurality of input buttons that allow the functionality discussed above with reference to the method 100. However, a variety of other portable/mobile payer devices and/or desktop payer devices may be used in the method 100 without departing from the scope of the present disclosure. Furthermore, the device 600 may include cameras (such as the camera 608 illustrated on the front side of the chassis 602) on either side of the chassis 602, microphones and speakers 610, accelerometers (not illustrated), network communication devices (not illustrated), and/or a variety of other sensors known in the art.

Figure 7:
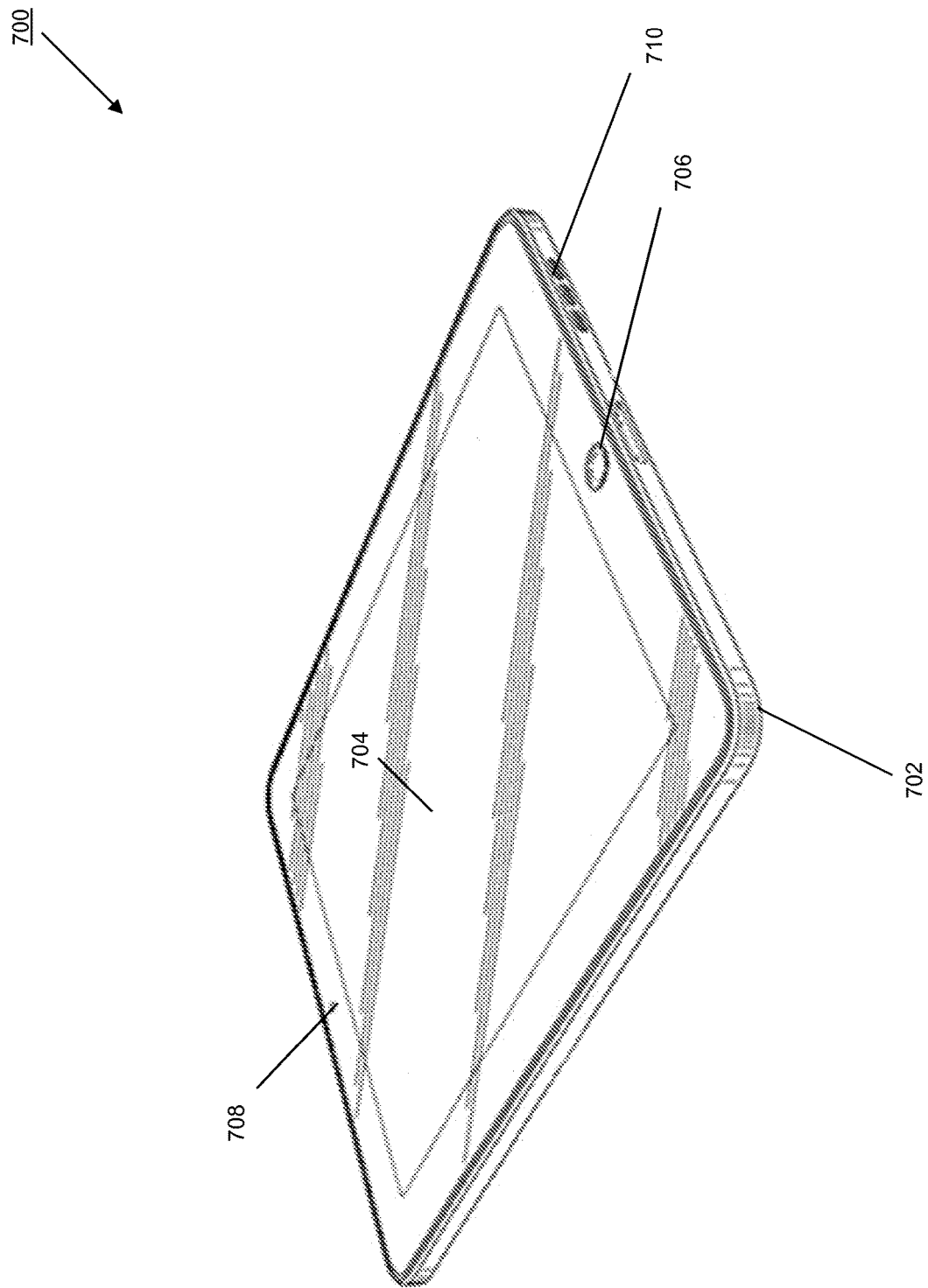
FIG. 7 is a perspective view illustrating an embodiment of a user device

Referring now to FIG. 7, an embodiment of a user device 700 is illustrated. The user device 700 may be the user devices 202, 300, 400, and/or 502, discussed above. The user device 700 includes a chassis 702 having a display 704 and an input device including the display 704 and an input button 706. One of skill in the art will recognize that the user device 700 is a tablet computer including a touch screen input device and a button that allow the functionality discussed above with reference to the method 100. However, a variety of other tablet Furthermore, the user device 700 may include cameras (such as the camera 708 illustrated on the front side of the chassis 702) on either side of the chassis 702, microphones and speakers 710, accelerometers (not illustrated), network communication devices (not illustrated), and/or a variety of other sensors known in the art.

Figure 8:
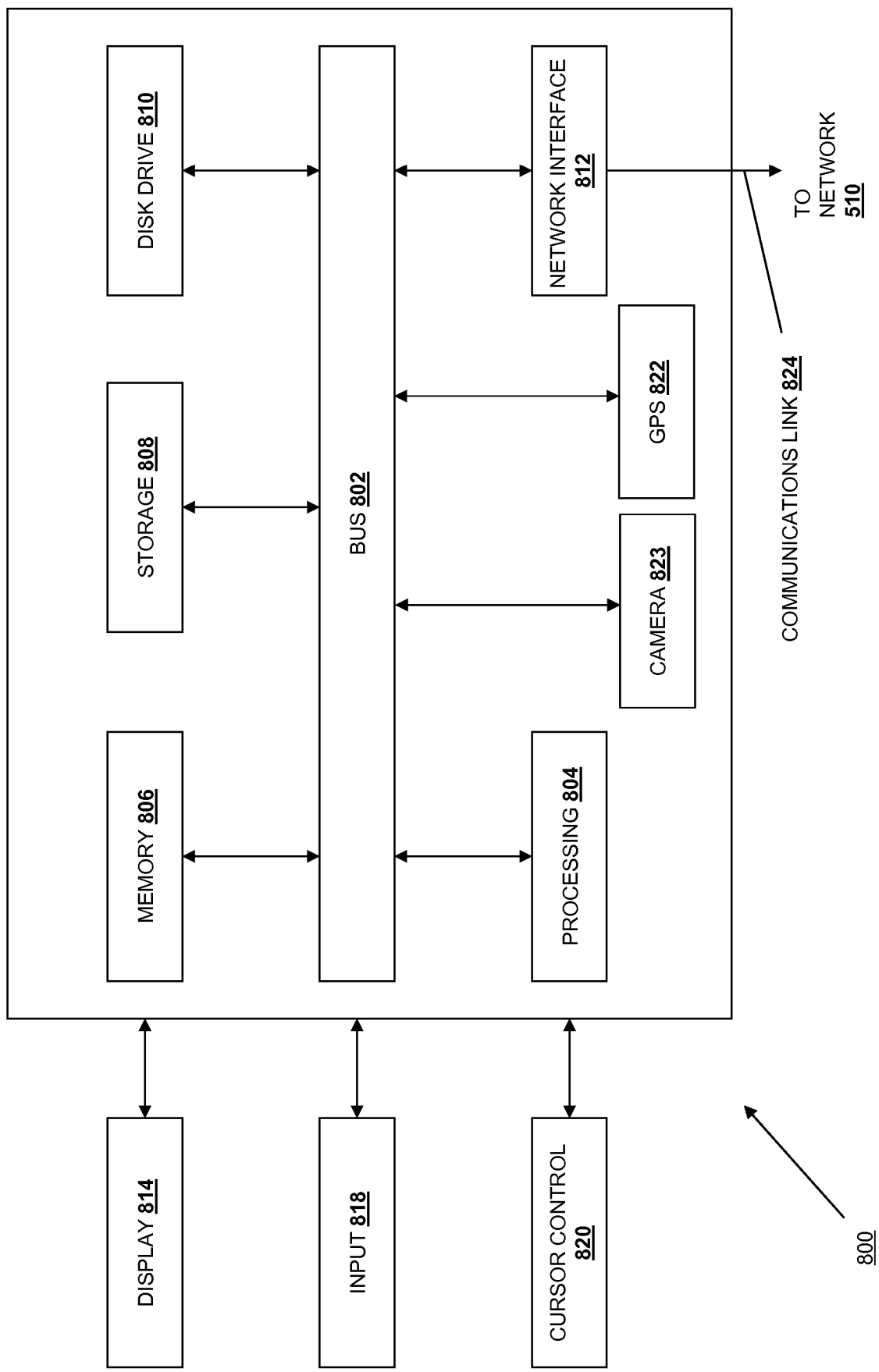
FIG. 8 is a schematic view illustrating an embodiment of a computer system.

Referring now to FIG. 8, an embodiment of a computer system 800 suitable for implementing, for example, the user devices 202, 300, 400, 502, 600, and/or 700, the merchant devices 504, the payment service provider device 506, the account provider device 508, and/or the system provider device 509 is illustrated. It should be appreciated that other devices utilized by users, merchants, payment service providers, account providers, and system providers in the payment system discussed above may be implemented as the computer system 800 in a manner as follows.

In accordance with various embodiments of the present disclosure, computer system 800, such as a computer and/or a network server, includes a bus 802 or other communication mechanism for communicating information, which interconnects subsystems and components, such as a processing component 804 (e.g., processor, micro-controller, digital signal processor (DSP), etc.), a system memory component 806 (e.g., RAM), a static storage component 808 (e.g., ROM), a disk drive component 810 (e.g., magnetic or optical), a network interface component 812 (e.g., modem or Ethernet card), a display component 814 (e.g., CRT or LCD), an input component 818 (e.g., keyboard, keypad, or virtual keyboard), a cursor control component 820 (e.g., mouse, pointer, or trackball), a location determination component 822 (e.g., a Global Positioning System (GPS) device as illustrated, a cell tower triangulation device, and/or a variety of other location determination devices known in the art), and/or a camera 823. In addition, sensors including temperature sensors, accelerometers, and/or a variety of other sensors known in the art but not illustrated may be coupled to the bus 802. In one implementation, the disk drive component 810 may comprise a database having one or more disk drive components.

In accordance with embodiments of the present disclosure, the computer system 800 performs specific operations by the processor 804 executing one or more sequences of instructions contained in the memory component 806, such as described herein with respect to the user devices 202, 300, 400, 502, 600, and/or 700, the merchant devices 504, the payment service provider device 506, the account provider device 508, and/or the system provider device 509. Such instructions may be read into the system memory component 806 from another computer readable medium, such as the static storage component 808 or the disk drive component 810. In other embodiments, hard-wired circuitry may be used in place of or in combination with software instructions to implement the present disclosure.

Logic may be encoded in a computer readable medium, which may refer to any medium that participates in providing instructions to the processor 804 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 810, volatile media includes dynamic memory, such as the system memory component 806, and transmission media includes coaxial cables, copper wire, and fiber optics, including wires that comprise the bus 802. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 800. In various other embodiments of the present disclosure, a plurality of the computer systems 800 coupled by a communication link 824 to the network 510 (e.g., such as a LAN, WLAN, PTSN, and/or various other wired or wireless networks, including telecommunications, mobile, and cellular phone networks) may perform instruction sequences to practice the present disclosure in coordination with one another.

The computer system 800 may transmit and receive messages, data, information and instructions, including one or more programs (i.e., application code) through the communication link 824 and the network interface component 812. The network interface component 812 may include an antenna, either separate or integrated, to enable transmission and reception via the communication link 824. Received program code may be executed by processor 804 as received and/or stored in disk drive component 810 or some other non-volatile storage component for execution.

Figure 9:
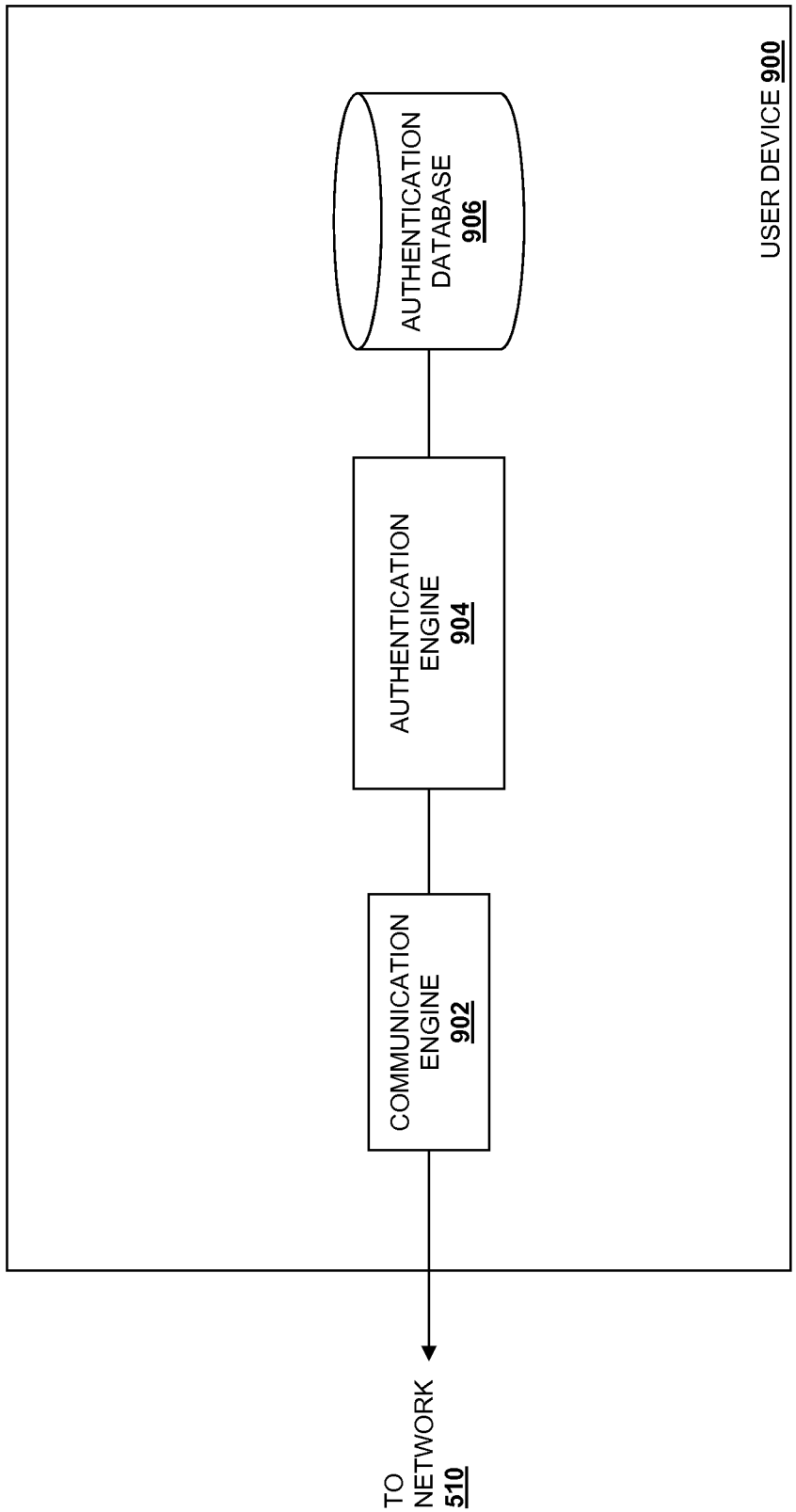
FIG. 9 is a schematic view illustrating an embodiment of a user device.

Referring now to FIG. 9, an embodiment of a user device 900 is illustrated. In an embodiment, the device 900 may be the user devices 202, 300, 400, 502, 600, and/or 700, as well as include portions provided by a system provider device 509 in some embodiments. The user device 900 includes a communication engine 902 that is coupled to the network 510 and to an authentication engine 904 that is coupled to an authentication database 906. The communication engine 902 may be software or instructions stored on a computer-readable medium that allows the user device 900 to send and receive information over the network 510. The authentication engine 904 may be software or instructions stored on a computer-readable medium that is operable to determine authentication profiles, store authentication profiles in the authentication database 906, authenticate a user by comparing an authentication passcode input to user authentication passcodes, detect authentication factors, determine whether the authentication factors match authentication profiles in the authentication database 906, and provide any of the other functionality that is discussed above. While the authentication database 906 has been illustrated as located in the user device 900, one of skill in the art will recognize that it may be connected to the authentication engine 904 through the network 510 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on users and merchants; however, a payer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A device comprising:
a non-transitory memory storing instructions; and
one or more hardware processors coupled to the non-transitory memory and configured to read the instructions from the non-transitory memory to cause the device to perform operations comprising:
receiving an authentication code that enables an authentication of a plurality of applications on the device;
determining the authentication code matches a stored authentication code associated with the plurality of applications on the device, the stored authentication code stored in an application profile;
in response to the determination that the authentication code matches the stored authentication code, authenticating a user of the device for a first application and a second application of the plurality of applications, wherein the second application comprises a payment application associated with an online payment provider, and wherein the authenticating the user for the second application comprises enabling a usage of a payment account with the online payment provider at a first spending limit within the second application;
determining a timeout of an authentication of the user for the first application and the second application from the authenticating;
receiving an authentication factor at the device after the timeout of the authentication, wherein the authentication factor comprises a first touch input on a display of the device;
determining a first user profile for the device based on the first touch input matching a stored first authentication factor saved in the first user profile, wherein the stored first authentication factor is associated with a previous use of the device;
determining the authentication factor matches a stored first authentication factor, wherein the stored first authentication factor is saved in a first user profile;
allowing a continued access to the first application based in part on the determination that the authentication factor received matches the stored first authentication factor; and
restricting an access to the second application on the device based on the first user profile and the determination that the authentication factor received matches the stored first authentication factor, wherein the access to the second application is restricted while the continued access to the first application is allowed, and wherein the restricting the access comprises enabling usage of the payment account at a second spending limit less than the first spending limit within the second application.

2. The device of claim 1, wherein the operations further comprise:
determining if the authentication factor further matches a stored second authentication factor, wherein the stored second authentication factor is stored in a second user profile; and
determining whether to extend the continued access to the first application based in part on if the authentication factor matches the stored second authentication factor.

3. The device of claim 2, wherein the operations further comprise:
requesting the authentication code if the authentication factor does not match the stored second authentication factor.

4. The device of claim 2, wherein the authentication factor further comprises a second touch input received on the display of the device and the second touch input is associated with the second user profile.

5. The device of claim 1, wherein the first user profile has a first restriction level for the first application and a second restriction level for the second application.

6. The device of claim 1, wherein the authentication factor further comprises at least one of a voice sample or an image.

7. The device of claim 2, wherein the stored first authentication factor is associated with a first user and the stored second authentication factor is associated with a second user.

8. The device of claim 1, wherein the authentication factor further comprises a detected wireless environment, and wherein the detected wireless environment matches a stored wireless environment in a wireless authentication profile associated with the first user profile.

9. A method for providing authentication, comprising
receiving an authentication code that enables an authentication of a plurality of applications on a device;
determining the authentication code matches a stored authentication code associated with the plurality of applications on the device, the stored authentication code stored in an application profile;
in response to the determining that the authentication code matches the stored authentication code, authenticating a user of the device for a first application and a second application of the plurality of applications, wherein the second application comprises a payment application associated with an online payment provider, and wherein the authenticating the user for the second application comprises enabling a usage of a payment account with the online payment provider at a first spending limit within the second application;
determining a timeout of an authentication of the user for the first application and the second application from the authenticating;
receiving an authentication factor at the device, wherein the authentication factor comprises at least one of a voice sample or an image;
determining a first user profile for the device based on the at least one of the voice sample or the image matching a stored first authentication factor saved in the first user profile, wherein the stored first authentication factor is associated with a previous use of the device;
determining if the authentication factor matches a stored first authentication factor stored in a first user profile;
allowing a continued access to the first application based in part on determining that the authentication factor received matches the stored first authentication factor; and
restricting an access to the second application on the device based on the first user profile and the determining that the authentication factor received matches the stored first authentication factor, wherein the access to the second application is restricted while the continued access to the first application is allowed, and wherein the restricting the access comprises enabling a usage of the payment account at a second spending limit less than the first spending limit within the second application.

10. The method of claim 9, further comprising:
determining if the authentication factor further matches a stored second authentication factor, wherein the stored second authentication factor is stored in a second user profile; and
determining whether to extend the continued access to the first application based in part on the determining if the authentication factor matches the stored second authentication factor.

11. The method of claim 10, further comprising:
requesting the authentication code if the authentication factor does not match the stored second authentication factor.

12. The method of claim 9, wherein the authentication factor further comprises a first touch input received on a display of the device and the first touch input is associated with the first user profile.

13. The method of claim 10, wherein the first user profile has a first restriction level for the first application and a second restriction level for the second application.

14. The method of claim 9, wherein the authentication factor further comprises a detected wireless environment, and wherein the detected wireless environment matches a stored wireless environment in a wireless authentication profile associated with the first user profile.

15. A non-transitory machine-readable medium having stored thereon machine-readable instructions executed to cause a machine to perform operations comprising:
receiving an authentication code that enables an authentication of a plurality of applications on a device;
determining the authentication code matches a stored authentication code associated with the plurality of applications on the device, wherein the stored authentication code is stored in an application profile;
in response to the determining that the authentication code matches the stored authentication code, authenticating a user of the device for a first application and a second application of the plurality of applications, wherein the second application comprises a payment application associated with an online payment provider, and wherein the authenticating the user for the second application comprises enabling a usage of a payment account with the online payment provider at a first spending limit within the second application;
determining a timeout of an authentication of the user for the first application and the second application from the authenticating;
receiving an authentication factor at the device, wherein the authentication factor comprises a detected wireless environment;
determining a first user profile for the device based on the detected wireless environment matching a stored first authentication factor saved in the first user profile, wherein the stored first authentication factor is associated with a previous use of the device, and wherein the stored first authentication factor comprises a stored wireless environment;
determining the authentication factor matches a stored first authentication factor stored in a first user profile;
allowing a continued access to the first application based in part on the determining that the authentication factor received matches the stored first authentication factor; and
restricting an access to the second application on the device based on the first user profile and the determination that the authentication factor received matches the stored first authentication factor, wherein the access to the second application is restricted while the continued access to the first application is allowed, and wherein the restricting the access comprises enabling a usage of the payment account at a second spending limit less than the first spending limit within the second application.

16. The non-transitory machine-readable medium of claim 15,
wherein the operations further comprise:
determining if the authentication factor further matches a stored second authentication factor, wherein the stored second authentication factor is saved in a second user profile; and
determining whether to extend the continued access to the first application based in part on the determining if the authentication factor matches the stored second authentication factor.

17. The non-transitory machine-readable medium of claim 16,
wherein the operations further comprise:
requesting the authentication code if the authentication factor does not match the stored second authentication factor.

18. The non-transitory machine-readable medium of claim 16, wherein the first user profile has a first restriction level for the first application and a second restriction level for the second application.

19. The device of claim 1, wherein the allowing the continued access comprises extending a first time period for the access to the first application after the timeout of the authentication, and wherein the restricting the access to the second application comprises ending a second time period for the access to the second application after the timeout of the authentication.

20. The non-transitory machine-readable medium of claim 16, wherein the authentication factor further comprises at least one of a touch input, a voice sample, or an image.

* * * * *